United States Patent
Soon-Shiong

(10) Patent No.: US 12,514,796 B2
(45) Date of Patent: Jan. 6, 2026

(54) ARAGONITE COMPOSITIONS, METHODS, AND USES THEREOF

(71) Applicant: Nant Holdings IP, LLC, Culver City, CA (US)

(72) Inventor: Patrick Soon-Shiong, Culver City, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 875 days.

(21) Appl. No.: 17/514,949

(22) Filed: Oct. 29, 2021

(65) Prior Publication Data

US 2022/0047474 A1    Feb. 17, 2022

Related U.S. Application Data

(63) Continuation-in-part of application No. 17/423,279, filed as application No. PCT/US2020/013562 on Jan. 14, 2020, now Pat. No. 12,180,370.

(60) Provisional application No. 63/233,660, filed on Aug. 16, 2021, provisional application No. 62/874,253, filed on Jul. 15, 2019, provisional application No. 62/867,489, filed on Jun. 27, 2019, provisional application No. 62/792,735, filed on Jan. 15, 2019.

(51) Int. Cl.
| | |
|---|---|
| *A61K 8/21* | (2006.01) |
| *A61K 33/10* | (2006.01) |
| *A61K 39/00* | (2006.01) |
| *A61K 39/39* | (2006.01) |
| *A61Q 11/00* | (2006.01) |
| *B82Y 5/00* | (2011.01) |

(52) U.S. Cl.
CPC .............. *A61K 8/21* (2013.01); *A61K 33/10* (2013.01); *A61K 39/39* (2013.01); *A61Q 11/00* (2013.01); *A61K 39/00* (2013.01); *A61K 2800/413* (2013.01); *A61K 2800/92* (2013.01); *B82Y 5/00* (2013.01)

(58) Field of Classification Search
CPC .......... A61K 8/21; A61K 33/10; A61K 39/39; A61K 39/00; A61K 2800/413; A61K 2800/92; A61Q 11/00; B82Y 5/00
See application file for complete search history.

(56) References Cited

U.S. PATENT DOCUMENTS

| | | | |
|---|---|---|---|
| 3,920,800 A * | 11/1975 | Harris | ....................... C09C 1/021 423/DIG. 15 |
| 3,951,895 A | 4/1976 | Anthenien et al. | |
| 5,480,827 A | 1/1996 | Guillemin et al. | |
| 6,106,811 A * | 8/2000 | Gibbs | ....................... A61K 8/19 424/49 |
| 8,945,905 B2 | 2/2015 | Brandt et al. | |
| 9,061,940 B2 | 6/2015 | Chen et al. | |
| 10,457,557 B2 | 10/2019 | Cesareo et al. | |
| 11,141,377 B2 | 10/2021 | Fox et al. | |
| 12,180,370 B2 | 12/2024 | Soon-Shiong | |
| 2003/0180208 A1 | 9/2003 | Yaniv | |
| 2006/0156959 A1 | 7/2006 | Engqvist et al. | |
| 2015/0050322 A1* | 2/2015 | Ashcroft | ............. A61K 8/0245 424/49 |
| 2017/0183469 A1* | 6/2017 | Falken | ....................... C08J 3/22 |
| 2017/0208827 A1 | 7/2017 | Riziq et al. | |
| 2017/0225427 A1 | 8/2017 | Tilton et al. | |
| 2020/0030815 A1 | 1/2020 | Chen | |
| 2020/0230056 A1 | 7/2020 | Fox et al. | |

FOREIGN PATENT DOCUMENTS

| | | |
|---|---|---|
| CN | 104119056 A | 10/2014 |
| CN | 108249824 A | 7/2018 |
| CN | 108751874 A | 11/2018 |
| EP | 1 210 092 A1 | 6/2002 |
| EP | 1 682 030 B1 | 12/2011 |
| EP | 2 939 985 A1 | 11/2015 |
| IT | 102017000126622 | 11/2017 |
| WO | 01/03709 A1 | 1/2001 |
| WO | 2009/025653 A1 | 2/2009 |
| WO | 2010/146574 A1 | 12/2010 |
| WO | 2011/081681 A1 | 7/2011 |
| WO | 2016/012583 A1 | 1/2016 |
| WO | 2016/078971 A1 | 5/2016 |
| WO | 2017/017281 A1 | 2/2017 |
| WO | 2019/091915 A1 | 5/2019 |
| WO | 2020/150274 A1 | 7/2020 |
| WO | 2020/150274 A1 | 7/2020 |

OTHER PUBLICATIONS

Jiao et al., "Quaternary ammonium-based biomedical material: State-of-the-art, toxicological aspects and antimicrobial resistance" in Progress in Polymer Science 71 (2017) 53-80. (Year: 2017).*
International Search Report and Written Opinion received in PCT Application Serial No. PCT/US2020/013562 dated May 7, 2020, 13 pages.
Zhao et al., "Preparation of Calcium Alginate Microgel Beads in an Electrodispersion Reactor Using an Internal Source of Calcium Carbonate Nanoparticles", Langmuir, 2007, vol. 23, pp. 12489-12496.
Walker et al., "Solid-State Transformation of Amorphous Calcium Carbonate to Aragonite Captured by CryoTEM", Angewandte Chemie International Edition, 2017, 7 pages.

(Continued)

*Primary Examiner* — Blessing M Fubara
(74) *Attorney, Agent, or Firm* — Umberg Zipser LLP; Martin Fessenmaier; Priti Phukan

(57) ABSTRACT

Compositions, methods, and uses of calcium carbonate-based composition are presented. The calcium carbonate-based composition includes a plurality of restructured calcium carbonate particles that has an average size of equal or less than 10 microns in diameter. Preferably, the calcium carbonate-based composition is generated by unstructuring the aragonite using an acid and a chelator and recrystallizing the unstructured aragonite in a customized form. Exemplary aragonite-based compositions include pavement compositions.

20 Claims, 2 Drawing Sheets

(56) References Cited

OTHER PUBLICATIONS

Kajiyama et al., "Aragonite nanorods in calcium carbonate/polymer hybrids formed through self-organization processes from amorphous calcium carbonate solution", Small, 2014, vol. 10, No. 8, pp. 1634-1641.
Huang et al., "A carbonate controlled-addition method for amorphous calcium carbonate spheres stabilized by poly (acrylic acid)s", Langmuir, 2007, vol. 23, pp. 12086-12095.
Yang et al., "Poly(acrylic acid)-regulated Synthesis of Rod-Like Calcium Carbonate Nanoparticles for Inducing the Osteogenic Differentiation of MC3T3-E1 Cells", International Journal of Molecular Sciences, 2016, vol. 17, No. 639, pp. 1-11.
Westin et al., "Crystal growth of aragonite and calcite in presence of citric acid, DTPA, EDTA and pyromellitic acid", Journal of Colloid Interface Science, 2005, vol. 282, pp. 359-369.
Gong et al., "Learning from nature: constructing high performance graphene-based nanocomposites" Materials Today, 2016, 10 pages.
Vago Razi, "Beyond the skeleton Cnidarian biomaterials as bioactive extracellular microenvironments for tissue engineering", Organogenesis, 2008, vol. 4, No. 1, pp. 18-22.
Boulos et al., "Spinning up the polymorphs of calcium carbonate", Scientific Report, 2014, vol. 4, No. 3616, pp. 1-6.
Wang et al., "Synthesis of CaCO3/graphene composite crystals for ultra-strong structural materials", The Royal Society of Chemistry, 2012, vol. 2, pp. 2154-2160.
Szunerits et al., "Antibacterial activity of graphene-based materials" Journal of Materials Chemistry Biology, 2016, vol. 4, No. 6892, 21 pages.
"Graphene road paves the way for end of potholes" The Times, 2019, 2 pages.
Kon et al., "Osteochondral regeneration with a novel aragonite-hyaluronate biphasic scaffold: up to 12-month follow-up study in a goat model", Journal of Orthopaedic Surgery and Research, 2015, vol. 10, No. 81, 17 Pages.
Youtube, "Oil clean-up performed by Grafysorber®—Long Version", URL: https://www.youtube.com/watch?v=FDHtPiiLr78, 2018, 3 pages.
International Preliminary Report on Patentability Chapter I received in PCT Application Serial No. PCT /US2020/01356, dated Jul. 29, 2021, 10 pages.
Rice et al., "A Next Generation Bivalent Human Ad5 COVID-19 Vaccine Delivering Both Spike and Nucleocapsid Antigens Elicits Th1 Dominant CD4+, CD8+ T-cell and Neutralizing Antibody Responses", bioRxiv preprint, 2020, 36 pages.
Sinopec Corp. "Products and engineering application of Sinopec's Donghai Asphalt" from Sinopec Corp. website, accessed Jun. 1, 2024, http://www.sinopec.com/listco/en/products_service/asphalU (Year: 2024).
Widyastuti et al., "Synthesis and characterization of CaCO3 (calcite) nano particles from cockle shells (Anadara granosa Linn) by precipitation method", June 2017AIP Conference Proceedings 1855(1):030018.
Bezerra et al., "Production of Filler Aggregate from Waste of Bivalves Molluscs Shells", Journal of Civil Engineering and Architecture, Apr. 2011, vol. 5, No. 4 (Serial No. 41), pp. 363-367.
Marasteanu et al. "Graphene nano-platelet (GNP) reinforced asphalt binders and mixtures" in E&E Congress 2016, 6th Eurasphalt & Eurobitume Congress, 2016. (Year: 2016).
Ozunlu et al. "A novel approach to light weight and cost effective automotive trim production by integration of graphene from recycled waste tire" from SPE ACCE Conference at Detroit, Michigan, Sep. 2018.
Youtube, "GRAFYSORBER®_Sand Treatment", https://www.youtube.com/watch?v=y3DH8LGx4C8, 2016.
Arogonite plus citric acid plus alginate plus coloring Tofu patent (https://en.wikipedia.org/wiki/Tofu).
Calcium Sulphate, https://en.wikipedia.org/wiki/Calcium_sulfate.
Ataogonite !!! , https://www.earthsourcefoods.com.au/blogposts/2016/10/3/is-tofu-a-high-calcium-food.
Graphene Plus, A revolutionary enabling technology from laboratory research to daily life applications, DirectaPlus, 31 Pages.
Ecor, "The Foundation of a Circular Future", 56 Pages.
Calcean Renewable | Biogenic, "Calcean, Sustainable Plastic Enhancers", 27 Pages.
Ecor, " Investment Thesis", Noble Environmental Technologies, Executive Summary, 2 Pages.
G+ Upgraded Asphalt Supermodifier for Longlasting Road Pavements, 13 Pages.

* cited by examiner

ARAGONITE COMPOSITIONS, METHODS, AND USES THEREOF

This application is a continuation-in-part application of co-pending U.S. patent application Ser. No. 17/423,279 filed July 15, 202, which is a National Stage Entry of PCT/US2020/013562 filed on Jan. 14, 2020, which claims priority to U.S. Provisional Application No. 62/792,735 filed on Jan. 15, 2019, U.S. Provisional Application No. 62/867,489 filed on Jun. 27, 2019, and U.S. Provisional Application No. 62/874,253 filed on Jul. 15, 2019 the entire contents of all referenced applications are herein incorporated by reference.

FIELD OF THE INVENTION

The field of the invention relates to compositions and methods of generating calcium carbonate-based composition for various uses, including compositions for road paving.

BACKGROUND

The background description includes information that may be useful in understanding the present disclosure. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Calcium carbonate is a common substance found in rocks, pearls, and the shells of eggs or marine organisms (e.g., mollusk, corals, etc.). Calcium carbonates are used in many industry fields including: the construction industry as a building material; the oil industry as formation-bridging and filtercake-sealing agent in the drilling fluid; and household uses including glues, chalks, bio-plastics, and fillers. In addition, calcium carbonates are frequently used in health and food industries including gastric antacid, calcium supplements, phosphate binder for the treatment of hyperphosphatemia (for chronic renal failure patient), and medical uses including dental implant, tissue scaffolds, etc.

Calcium carbonate in nature generally exists in two forms: calcite or aragonite. Aragonite is formed naturally in all mollusk shells and in the calcareous endoskeletons of warm- and cold-water corals. Aragonite also accumulates as inorganic precipitates from marine cements in the ocean. While aragonite shares the same chemistry with calcite, aragonite is a polymorph of calcite having different symmetry and crystal structure from calcite. For example, in aragonite, the carbonate ions lie in two planes that point in opposite directions. This bi-planar configuration destroys the trigonal symmetry that is characteristic of calcite's structure. Aragonite's bi-planar structure gives rise, in turn, to aragonite's orthorhombic symmetry and relative instability at high temperature. Amorphous calcium carbonate can form into aragonite in specific conditions (e.g., coral-growing conditions, etc.). Such formed aragonite provides benefits being more resistant in shear stress and lower pH conditions.

These properties of aragonite make it useful in various circumstances. For example, Kon et al. (2015) *J. Orthop. Surg. Res.* 10:81 report that aragonite can be used as a tissue scaffold (e.g., aragonite-hyaluronate scaffold) that is used for osteochondral regeneration. WO 2010/146574 to Altschuler reports that aragonite-based scaffolds can be used for repair, regeneration, enhancement of formation of cartilage and/or bone. U.S. Pat. No. 5,480,827 to Guillemin reports that porous polycrystalline aragonite can be used as a support material for cell culture.

Asphalt is widely used for making roads. Asphalt is a dark brown to black cementitious material in which the predominating constituents are bitumens that occur in nature or are obtained in petroleum processing. Bitumen is a generic term for natural or manufactured black or dark-colored solid, semisolid, or viscous cementitious materials that are composed mainly of high molecular weight hydrocarbons.

The widespread use of asphalt in making roads relies on its remarkable waterproofing and binding properties. The hard surfaces of roads, for example, depend on the ability of asphalt to cement together aggregates of stone and sand.

A number of factors impinge on the performance of asphalt. These include its composition and the crude oil source, the type and amount of aggregate used, the presence of moisture, the method of road construction, surrounding temperature, exposure to sun, and, of course, the volume of traffic. Ideally, asphalt used for paving roads should remain viscoelastic in all weather conditions. However, many asphalt roads soften in summer during high temperatures and suffer from rutting, or permanent deformation. At low temperatures, neutral molecules in asphalt arrange themselves into more organized structural forms. As a result, the material hardens, becomes brittle, and cracks under the stress of heavy traffic loads. This is known as thermal or fatigue cracking.

Asphalt compositions may also lose their plasticity. In particular, asphalt compositions harden and crack or crumble when they lose their more volatile lower molecular weight constituents or when these constituents are oxidized. This process is known as aging. Moisture from rain and other sources can also invade and damage asphalts, and aged or oxidized asphalts are most susceptible to moisture damage because they have a larger number of polar constituents to attract water molecules.

Furthermore, unrepaired roads are a dangerous hazard for drivers, while repair or replacement of roads is costly for small and large governments. Additionally, most asphalt compositions are fire and explosion hazards and are not environmentally favorable. As such, dangers and hazards to people and the environment are associated with conventional asphalt compositions.

Therefore, there remains a need for improved compositions and methods for making roads, such as compositions where asphalt is modified to make the road longer lasting—e.g., having a higher mechanical performance and/or being more fire resistant.

SUMMARY

Disclosed herein are various compositions of, methods for, and use of aragonite-based compositions and formation of various forms of crystals/shapes of aragonite-based compositions. Aragonite-based compositions include pavement compositions for making roads. Preferably, the road pavement composition includes a bituminous conglomerate, graphene, and aragonite.

Preferably, the bituminous conglomerate of the road pavement composition includes a thermoplastic polymer selected from the group consisting of polyvinylbutyral (PVB), polyethylacrylate (PEA) polymethylacrylate (PMA), polybutylacrilate (PBA), and lignin. The composition may further include aggregate and/or reclaimed asphalt pavement, which advantageously results in an environmentally sustainable road pavement composition. Alternatively or additionally, the bituminous conglomerate is selected from the group consisting of: naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, and combinations thereof.

The aragonite used herein for the road pavement composition may comprise a plurality of restructured calcium carbonate particles having an average diameter less than or equal to 10 μm. For example, the average particle diameter of the aragonite may be between 100 nm and 10 μm. additionally, or alternatively, at least half of the plurality of restructured calcium carbonate particles have a diameter between 100 nm and 10 μm. The aragonite is contemplated to be between 0.0005% to 5% of the total weight of the composition. In some cases, the aragonite is derived from a portion of a marine animal.

Preferably, the graphene used in the compositions and methods disclosed herein may be between 0.0005% to 1% of the total weight of the composition. In some cases, the graphene is recycled graphene. Typically, the graphene is graphene nanoplatelets.

In some embodiments, the composition may further comprise a surfactant. The surfactant may be between 0.0005% to 2% of the total weight of the composition.

Advantageously, the pavement composition as disclosed herein is highly fire resistant. For example, in some embodiments, the composition may have an ignition temperature of at least 1000° C.

As a further advantage, the pavement composition as disclosed herein has increased strength compared to conventional pavement compositions without aragonite and/or graphene. Preferably, the pavement composition has increased strength and is less prone to buckling and/or rutting than conventional pavement compositions. Strength of the pavement composition may be measured using indirect tensile strength as disclosed herein.

Further disclosed herein is a method of making a paved road with improved mechanical properties, comprising, mixing the composition as disclosed herein with stirring and compression at a temperature between 130° C. and 200° C., and laying the composition on the ground with mechanical pressure, to form the paved road. The method may further comprise blowing air through the hot composition to remove more volatile compounds, leading to a longer lifetime and added mechanical properties of the paved road.

In additional aspects of the contemplated subject matter, calcium carbonate-based compositions are disclosed herein comprising a plurality of restructured calcium carbonate particles coupled with a plurality of matrix molecule. The plurality of restructured calcium carbonate particles have an average size ≤10 μm in diameter. As used herein, "diameter" conveys the longest transverse distance through the particle that passes through the particle's center of mass. Most typically, the restructured calcium carbonate particles derive from a portion of a marine organism comprising aragonite. In some embodiments, the aragonite is coupled with a protein.

In some embodiments, the restructured calcium carbonate is generated by unstructuring the aragonite using an acid and a chelator and recrystallizing the unstructured aragonite. Preferably, the acid is sodium citrate or citric acid, and/or the chelator is EDTA or EGTA. Then, in some embodiments, the recrystallizing step further comprises a step of spray-drying the unstructured aragonite. Preferably, the composition has a decomposition temperature of at least 1000° C.

Preferably, the average particle size is between 100 nm and 10 μm in diameter, and/or at least half of the plurality of restructured calcium carbonate particles have a size between 100 nm and 10 μm in diameter.

In some embodiments, the matrix molecule is graphene. Alternatively and/or additionally, the plurality of restructured calcium carbonate particles forms a first layer and the plurality of matrix molecules form a second layer.

Also disclosed herein are methods of making calcium carbonate-based compositions. These methods include a step of preparing aragonite slurry comprising unstructured aragonite, reconstituting the unstructured aragonite as a restructured calcium carbonate particle having an average size ≤10 μm in diameter, and morphing the restructured calcium carbonate particle into a customized form.

In some embodiments, the aragonite slurry is prepared using acid and chelator. Preferably, the acid is sodium citrate or citric acid, and/or the chelator is EDTA or EGTA. In some embodiments, the reconstituting step further comprises a step of spray-drying the unstructured aragonite. Preferably, the composition has a decomposition temperature ≥1000° C.

Preferably, the average particle diameter is between 100 nm and 10 μm, and/or at least half of the plurality of restructured calcium carbonate particles have a diameter between 100 nm and 10 μm.

In some embodiments, the method further comprises coupling the reconstituted unstructured aragonite with a matrix molecule. In some embodiments, the matrix molecule is graphene and/or polylactic acid or ethylene, with which the unstructured aragonite can form a polymer.

Still further disclosed are calcium carbonate-based compositions that include a plurality of modified aragonite particles in a carrier, wherein the aragonite particles are modified to deliver a negatively charged bioactive agent to a target cell or target tissue in a mammal when the composition is administered to the mammal, and wherein the bioactive agent is negatively charged at physiological pH. The modified aragonite particles are formed from restructured oolitic aragonite and have an average diameter less than or equal to 10 μm and may, for example, have an average particle diameter of between 100 nm and 10 μm or an average particle diameter of between 10 nm and 1 μm.

In some embodiments, the carrier comprises a detergent, and optionally at least one of a viscosity agent, a flavorant, an antibacterial agent, and a whitening agent. For example, the carrier may be formulated as a toothpaste. Preferably, the negatively charged bioactive agent is then a fluoride anion. As will be appreciated, the fluoride anion may be present in a salt form that may be coated onto or interspersed with the modified aragonite particles. Alternatively, or additionally, the fluoride anion may be bound to a cationic compound that is bound to the modified aragonite particles. Exemplary cationic compounds include a cationic lipid, a quaternary ammonium compound, a lipopolyamine, 1,2-dioleoyloxy-3-(trimethylammonio)propane (DOTAP), dimethyldioctadecyl-ammonium (DDA), 1,2-dimyristoyl-3-trimethylammonium propane (DMTAP), dipalmitoyltrimethylammonium propane (DPTAP), and/or distearoyltrimethylammonium propane (DSTAP).

In other embodiments, the carrier is formulated for injection and the negatively charged bioactive agent is a nucleic acid (e.g., an RNA that encodes an antigen of a pathogen or that encodes an antigen of a neoplastic cell or cancer cell). Most typically, the nucleic acid is bound to a cationic compound that is bound to the modified aragonite particles. Exemplary cationic compound include a cationic lipid, a quaternary ammonium compound, a lipopolyamine, 1,2-dioleoyloxy-3-(trimethylammonio)propane (DOTAP), dimethyldioctadecyl-ammonium (DDA), 1,2-dimyristoyl-3-trimethylammonium propane (DMTAP), dipalmitoyl-trimethylammonium propane (DPTAP), and/or distearoyl-trimethylammonium propane (DSTAP).

Therefore, the inventor also contemplates a method of preparing a calcium carbonate-based composition that includes a step of providing oolitic aragonite particles, and treating the aragonite with an acid and a chelator to unstructure the aragonite particles. The unstructured aragonite particles are then recrystallized to form restructured oolitic aragonite particles, and a negatively charged bioactive agent (that is negatively charged at physiological pH) is coupled to or included in the restructured oolitic aragonite particles. Preferably, the restructured oolitic aragonite particles have an average particle diameter of between 100 nm and 10 μm. The bioactive agent may be coupled to the restructured oolitic aragonite particles via a cationic compound that is bound to the restructured oolitic aragonite particles.

For example, the negatively charged bioactive agent may be a fluoride anion and the composition may be formulated as a toothpaste. In another example, the negatively charged bioactive agent may be a nucleic acid and the composition may be formulated as a vaccine composition.

Various objects, features, aspects and advantages of the inventive subject matter will become more apparent from the following detailed description of preferred embodiments.

DETAILED DESCRIPTION

Figure 1:
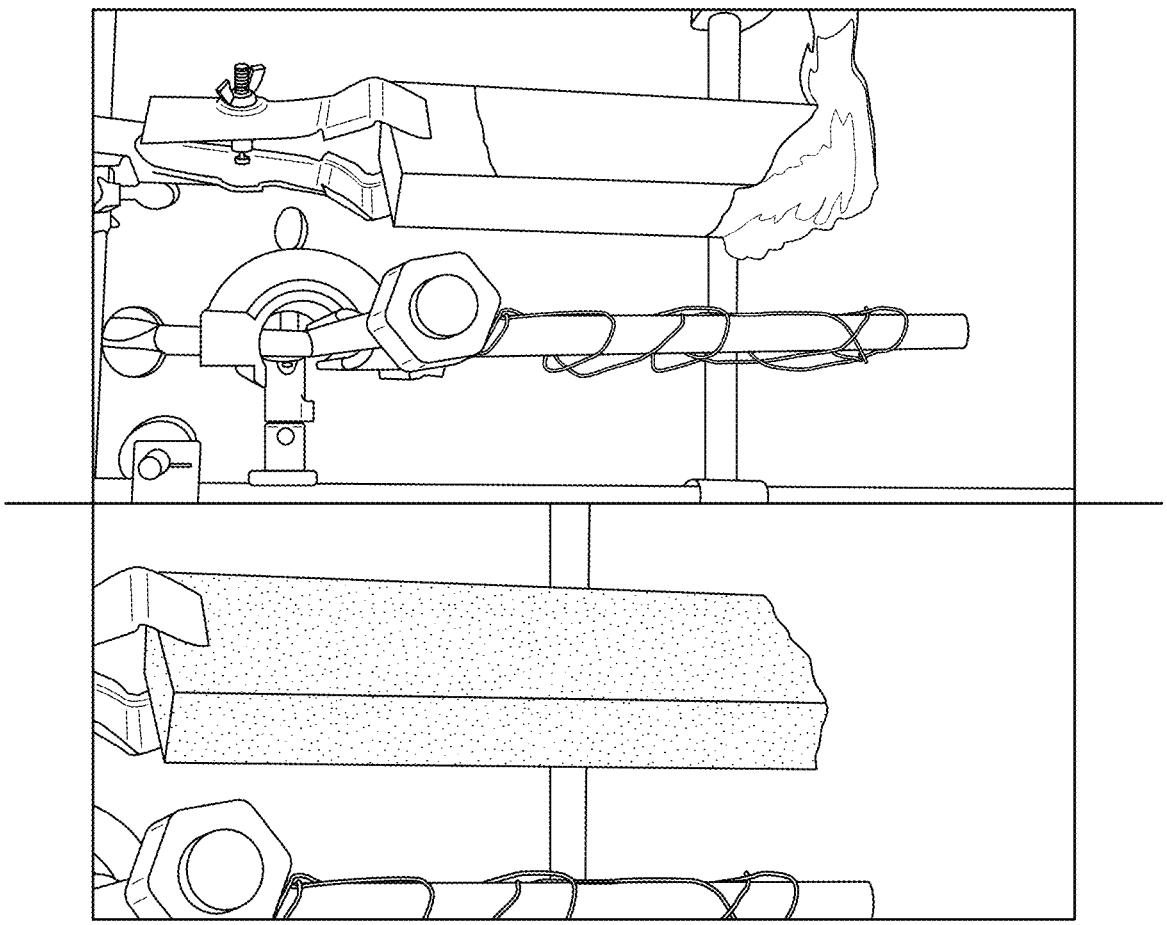
FIG. 1 illustrates the flame retardant properties of compositions disclosed herein.

As explained herein, calcium carbonate minerals, especially in a form of aragonite, can be processed to recrystallize and/or reform in various shapes for various uses while taking advantage of the mechanical and chemical properties of the calcium carbonate minerals. Thus, in one especially preferred aspect, the calcium carbonate minerals can be unstructured into amorphous molecular configurations, which can then be restructured/recrystallized into a desired crystalline form or shape. Throughout the instant disclosure, the terms "aragonite" and "calcium carbonate" are used interchangeably, and refers to the naturally occurring forms of calcium carbonate, $CaCO_3$. Example techniques for generating suitable aragonite beads are described in U.S. published patent application 2020/030815 to Myers et al. titled "Oolitic Aragonite Beads and Methods Therefor", filed Apr. 24, 2020.

Any suitable sources of calcium carbonate minerals are contemplated. For example, calcium carbonate minerals can be obtained from calcite sources including inorganic sources such as limestone, metamorphic marble, volcanic rocks, and/or organic sources such shells or marine organisms (e.g., plankton, algae, etc.). More preferably, calcium carbonate minerals can be obtained from aragonite sources, such as mollusk shells and calcareous endoskeletons of warm- and cold-water corals, or as inorganic precipitates as marine cements. It is further contemplated that where the calcium carbonate minerals are obtained from organic sources, it is preferred that organic molecules (e.g., proteins, lipids, etc.) in the calcium carbonate minerals be removed through any suitable procedures (e.g., protease treatment, etc.) before further processing of the calcium carbonate minerals. A suitable source of calcium carbonate is CalCean, LLC.

Methods and Uses of Aragonite in Pavement Compositions

In an especially advantageous aspect of the instant disclosure, the inventors have found that using aragonite beads or particles in a bituminous composition for paving roads provides for a pavement composition having higher mechanical performance (e.g., increased strength), greater fire retardant properties, similar or superior compaction, with at least an equal cure rate to conventional pavement compositions. Furthermore, the use of aragonite beads in road pavement compositions renders the roads less susceptible to ignition and fire. Preferably, the pavement composition disclosed herein also comprises graphene. The combination of graphene and aragonite in the pavement composition provides for increased strength while being more environmentally favorable with a lower carbon footprint.

The terms "bitumen" or "bituminous" in the present invention refer to naturally-occurring bitumen and modified bitumen. They are also known as "asphalt." Any known bitumen that meets specifications of performance grade, viscosity grade, or penetration graded may be used in the compositions of the present disclosure. Suitable aggregates have properties that meet specifications established by the appropriate transportation authorities as suitable for use in construction of load-bearing pavements. For example, the bituminous conglomerate used herein may comprise one or more of the following: naturally occurring bitumen, bitumen derived from crude oil, petroleum pitch obtained from a cracking process, coal tar, polymer-modified bitumen, rubberized bitumen, rubberized bitumen containing recycled tire material, acid-modified bitumen, wax-modified bitumen, and combinations thereof. The bituminous conglomerate may also contain additives such as natural rubber, synthetic rubber, plastomer, thermoplastic resin, thermosetting resin, elastomer, styrene-butadiene-styrene, styrene-butadiene-rubber, polyisoprene, polybutylene, butadiene-styrene rubber, vinyl polymer, ethylene vinyl acetate, ethylene vinyl acetate derivative, sulfur-containing cross-linker, salt, acid modifier, wax modifier, and combinations thereof. The bituminous conglomerate may further comprise an acid modifier, such as, tall oil acid, distilled tall oil, crude tall oil, tall oil pitch, phosphoric acid, derivative of tall oil acids, phosphoric acid derivative of tall oil pitch, polyphosphoric acid, and combinations thereof.

A number of factors affect the performance of asphalt and/or bituminous conglomerates. These include its composition and the crude oil source, the type and amount of aggregate used, the presence of moisture, the method of road construction, temperature, and, of course, the volume of traffic. Ideally, asphalt used for paving roads should remain viscoelastic in all weather conditions. However, many asphalt roads soften in summer and suffer from rutting, or permanent deformation, as it is also called. At low temperatures, neutral molecules in asphalt arrange themselves into more organized structural forms. As a result, the material hardens, becomes brittle, and cracks under the stress of heavy traffic loads. This is known as thermal and fatigue cracking. Asphalts also lose their plasticity and therefore harden and crack or crumble when they lose their more volatile lower molecular weight constituents or when these constituents are oxidized.

The presence of aragonite mixed with the asphalt is contemplated to enable the pavement composition to maintain its viscoelasticity and plasticity for a longer period of time. Additionally, or alternatively, calcium carbonate particles derived from a portion of a marine organism may also be used. Thus, in other words, the terms "aragonite" and "calcium carbonate particles" are used interchangeable in this disclosure.

The amount of aragonite contemplated in the pavement compositions disclosed herein is at least 50%, or more preferably at least 45%, or more preferably at least 40%, or more preferably at least 35%, or more preferably at least 30%, or more preferably at least 25%, or more preferably at least 20%, or more preferably at least 15%, or more preferably at least 10%, or more preferably at least 5%, or more preferably at least 3%, or more preferably at least 1%, and in some cases, at least 0.0005%.

The aragonites, or calcium carbonate particles, are contemplated to have an average size ≤10 μm in diameter. As used herein, "diameter" conveys the longest transverse distance through the particle that passes through the particle's center of mass.

In some embodiments, the restructured calcium carbonate is generated by unstructuring the aragonite using an acid and a chelator and recrystallizing the unstructured aragonite as disclosed in more detail herein. Preferably, the acid is sodium citrate or citric acid, and/or the chelator is EDTA or EGTA. Then, in some embodiments, the recrystallizing step further comprises a step of spray-drying the unstructured aragonite. Preferably, the composition has a decomposition temperature of at least 1000° C.

Preferably, the average particle size is between 100 nm and 10 μm in diameter, and/or at least half of the plurality of restructured calcium carbonate particles have a size between 100 nm and 10 μm in diameter.

Additionally, the road pavement composition disclosed herein may also comprise a surfactant. The presence of surfactant delays aging process in roads. Moisture from rain and other sources can invade, and age asphalts, particularly aged or oxidized asphalts because they have a larger number of polar constituents to attract water molecules. The presence of a surfactant presents additional benefits to the composition, such as improved interfacial stability. A surfactant or combination of surfactants having structural attributes that impart low interfacial viscosity, low Marangoni effect, and high interfacial bitumen solubility at a temperature range of about 60° C. to about 120° C. to improve interfacial stability are contemplated.

In more preferred embodiments, the road pavement composition disclosed herein includes both aragonite and graphene mixed with the asphalt conglomerate. The graphene as contemplated herein is a carbon material with two-dimensional structure of carbon monoatomic layers with hexagonal matrix, wherein each carbon atom is bound to other three carbon atoms by a covalent bond and bound to the atoms of the adjacent layers by Van Der Waals forces, as well as it is meant any derivative functionalized of such carbon material, for example graphene oxide, i.e. graphene partially functionalized with oxygen comprising groups. The amount of graphene contemplated in the pavement compositions disclosed herein is at least 20%, or more preferably at least 15%, or more preferably at least 10%, or more preferably at least 5%, or more preferably at least 3%, or more preferably at least 1%, or more preferably at least 0.5%, or more preferably at least 0.1%, and in some cases, at least 0.0005%.

In some embodiments, the graphene used in the pavement compositions disclosed herein may be recycled graphene. Alternatively, the graphene used in the compositions disclosed herein may be virgin graphene, or a mixture of recycled graphene and virgin graphene. Preferably, the recycled and/or virgin graphene is in the form of graphene nanoplatelets. Graphene nanoplatelets are formed from a physical transformation of natural graphite. Graphene nanoplatelets have a high aspect ratio, have high lateral dimension (in the micron (um) range), and a low thickness (in the nanometer (nm) range). With reference to FIG. 1, graphene nanoplatelets coated on polystyrene provide a fire retardant protection (lower object) compared to polystyrene without a coating (upper object). Example suitable graphene nanoplatelets and their manufacture are described in U.S. Pat. No. 10,457,557 to Cesareo et al. titled "Process for Preparing Graphene Nanoplatelets", filed as a PCT application on Jun. 16, 2015. Further, a suitable source for graphene nanoplatelets includes Directa Plus S.P.A.

In one aspect, a paved road having high mechanical properties and longevity may be made using the compositions disclosed herein made of a bituminous. For example, the bituminous conglomerate as disclosed herein may be added to a metal vessel secured to a ring stand and heated on a hot plate to the target temperature of about 100° C. to 1000° C., and more preferably 100° C. to about 800° C.; and more preferably 200° C. to about 500° C. The heated bitumen is stirred in a high-shear mixer with serrated shear head at a speed at least, 16,000 rpm. Additives such as graphene and aragonite, and optionally a surfactant are added. The resulting dispersion is sampled for bitumen content, and then added to dense-graded paving grade aggregate having a temperature of about 60° C. to about 120° C. Finally, the aggregated composition is laid on the ground with mechanical pressure to make the road.

The paving composition made of a bituminous conglomerate together with aragonite and graphene as disclosed herein provides for a pavement composition having increased strength. A pavement composition with increased strength lasts longer—e.g., longer use as a functional road without damage such as potholes, buckling, or rutting. For example, the pavement composition may last up to 250% longer, at 40° C. the pavement composition may be up to 46% less prone to buckling, and/or the pavement composition may be resistant to ruts with up to a 35% decrease in rutting at 60° C.

In exemplary embodiments, the pavement composition made of a bituminous conglomerate together with aragonite and graphene as disclosed herein has a tensile strength greater than a pavement composition made with the bituminous conglomerate without the graphene and/or aragonite. Tensile strength may be measured as indirect tensile strength in MPa as disclosed in EN 12697-23. Additionally, the pavement composition made of a bituminous conglomerate together with aragonite and graphene as disclosed herein may have a greater resistance to rutting than a pavement composition made with the bituminous conglomerate without the graphene and/or aragonite. Rutting is a phenomenon of longitudinal deformation from the passage of wheels that causes a progressive lateral movement of the bituminous conglomerate mixtures. Rutting resistance may be measured by measuring the depth of a rut (e.g., in millimeters (mm), in centimeters (cm), etc.).

Additionally or alternatively, the pavement composition made of a bituminous conglomerate together with aragonite and graphene as disclosed herein has increased stiffness (e.g., greater resistance) compared to a pavement composition made with the bituminous conglomerate without the graphene and/or aragonite. The Stiffness Modulus of a pavement measures the ability of the bituminous mixture to spread in the superstructure as a result of load pressure (e.g., in a tire footprint area, etc.).

Also additionally or alternatively, the pavement composition made of a bituminous conglomerate together with aragonite and graphene as disclosed herein has greater durability than a pavement composition made with the bituminous conglomerate without the graphene and/or aragonite. Durability or fatigue resistance may be measured as fatigue cycles, wherein a fatigue resistance test simulates the pavement service life by subjecting the asphalt pavement sample to repeated cycles of deformation states caused by both vehicular traffic and seasonal cycles.

Methods and Uses of Aragonite in Compositions

Calcium carbonate minerals (including minerals pre-processed to remove organic molecules) can then be treated with unstructuring reagents to reduce the calcium carbonate minerals into amorphous calcium carbonate particle. As used herein, "unstructuring" refers to any processing that changes the crystallized structure of the calcium carbonate in the raw material to amorphous structure or to another structure. Exemplary unstructuring reagents include acid, preferably citric acid or its salt forms such as sodium citrate, formic acid, hydrochloric acid, nitric acid, sulfuric acid, hydrogen halide, halogen oxoacid, hypochloric acid, chloric acid, perchloric acid, periodic acid, a fluorosulfuric acid, a phosphoric acid, a fluoroantimonic acid, a fluoronoric acid, a hexafluorophosphoric acid, acetic acid, gluconic acid, lactic acid, oxalic acid, tartaric acid, chromic acid, sodium dioctylsulfosuccinate, polyaspartic acid, ethylenediamine tetraacetic acid (EDTA), diethylenetriaminepentaacetic acid (DTPA), pyromellitic acid (PMA), aminotriacetic acid, aminodiacetic acid, or hydroxy polycarboxylic acid.

In some embodiments the unstructuring reagents may also include a chelator such as EDTA, or ethylene glycol-bis(β-aminoethyl ether)-N,N,N',N'-tetraacetic acid (EGTA), (1,2-bis(o-aminophenoxy)ethane-N,N,N',N'-tetraacetic acid) (BAPTA), N,N-bis(2hydroxyethyl) glycine (Bicine), trans-1,2-diaminocyclohexane-ethylenediamine-N,N,N',N'-tetraacetic acid (CyDTA), 1,3-diamino-2-hydroxypropane-ethylenediamine-N,N,N',N'-tetraacetic acid (DPTA-OH), diethylenetriamine-N,N,N',N'',N''-pentaacetic acid (DPTA), ethylenediamine-N,N'-dipropionic acid dihydrochloride (EDDP), ethylenediamine-N,N'-bis(methylenephosphonic acid) hemihydrate (EDDPO), N-(2-hydroxyethyl)ethylenediamine-N,N',N'-triacetic acid (EDTA-OH), ethylenediamine-N,N,N',N'-tetrakis (methylenephosphonic acid) (EDTPO), O,O'-bis(2-aminoethyl), N,N'-bis(2-hydroxybenzyl)ethylenediamine-N,N'-diacetic acid (HBED), 1,6-hexamethylenediamine-N,N,N',N'-tetraacetic acid (HDTA), N-(2-hydroxyethyl)iminodiacetic acid (HIDA), iminodiacetic acid (IDA), 1,2-diaminopropane-N,N,N',N'-tetraacetic acid (methyl-EDTA), nitrilotriacetic acid (NTA), nitrilotripropionic acid (NTP), nitrilotris(methylenephosphonic acid) trisodium salt (NTPO), N,N,N',N'-tetrakis(2-pyridylmethyl)ethylenediamine (TPEN), and triethylenetetramine-N,N,N',N'',N''-hexaacetic acid (TTHA), rhod-2, DMSA, FLUO 3, FURA 2, INDO 1, or QUIN 2.

Any suitable amounts and ratios of unstructuring reagents are contemplated. For example, the acid may comprise at least 10 wt %, at least 20 wt %, at least 30 wt %, at least 40 wt %, less than 80 wt %, less than 70 wt %, less than 60 wt %, less than 50 wt % of the total unstructuring reagent or total reaction volume including the calcium carbonate mineral reacting with the unstructuring reagent. In another example, the chelator may comprise at least 0.1 wt %, at least 1 wt %, at least 5 wt %, at least 10 wt %, less than 50 wt %, less than 30 wt %, less than 10 wt %, less than 5 wt % of the total unstructuring reagent or total reaction volume including the calcium carbonate mineral reacting with the unstructuring reagent.

In certain embodiments, the chelator in the unstructuring reagent can act as a slow decalcifier by binding ionized calcium present on the outer layer of the mineral crystal and slowly reducing the size of the crystal. In addition, the acid in the unstructuring reagent can facilitate the dissolution of the calcium carbonate mineral. Thus, contacting calcium carbonate mineral with unstructuring reagent will generate a calcium carbonate slurry (amorphous calcium carbonate particles) with more homogenous crystal sizes and/or particle sizes. Preferably, the calcium carbonate slurry comprises particles of average diameter between 10 nm and 100 μm, preferably between 50 nm and 50 μm, and more preferably between 100 nm and 10 μm. Alternatively, the calcium carbonate slurry comprises at least 30%, at least 50%, at least 70%, at least 90% of the particles of average diameter between 10 nm and 100 μm, preferably between 50 nm and 50 μm, and more preferably between 100 nm and 10 μm.

The reaction duration or treatment time of unstructuring reagents with calcium carbonate mineral may vary depending on the types and concentration of chelator and/or acid in the unstructuring reagents. For example, a preferred reaction duration or treatment time is sufficient to generate a calcium carbonate slurry having particles of average diameter between 10 nm and 100 μm, preferably between 50 nm and 50 μm, and more preferably between 100 nm and 10 μm, or sufficient to generate a calcium carbonate slurry, in which at least 30%, at least 50%, at least 70%, at least 90% of the particles have average diameter between 10 nm and 100 μm, preferably between 50 nm and 50 μm, and more preferably between 100 nm and 10 μm.

In certain embodiments, the calcium carbonate slurry can be subject to vacuum rotation (spinning) and/or evaporation to remove at least 70%, at least 80%, at least 90% of the residual acid (e.g., sodium citrate, citric acid, etc.) from the slurry to increase the calcium carbonate content in the slurry, to stop dissolution, and to facilitate the crystal formation from the amorphous particles.

Various conditions including temperature, pH, addition of crystal modifiers, water content, alcohol content, time, presence of stabilizers (e.g., double hydrophilic block copolymers (DHBCs) composed of poly(ethylene oxide) (PEO) and poly(acrylic acid) (PAA), etc.), and/or status of slurry (e.g., shaking, spinning, etc.) may affect the speed and effectiveness of precipitation and crystal formation, as well as morphology of the crystals. Therefore, various calcium carbonate crystal morphologies can be obtained by modifying environmental conditions during calcium carbonate precipitation and crystal formation. As used herein, "morphology" refers not only to crystal shape (e.g., cube, prism, pyramid, cuboid, elongated cuboid, elongated tube, etc.), but also crystal size (e.g., thickness, length, diameter, etc.). For example, smaller cuboid crystals at a diameter between 1-5 μm and/or thickness may be obtained where the calcium carbonate slurry is precipitated at room temperature with spinning condition (e.g., 4500 rpm at an angle between 30-50 degree, etc.). In another example, larger cuboid crystals or elongated cuboid crystals at a diameter of 5-10 μm and/or thickness may be obtained where the calcium carbonate slurry is precipitated at room temperature without spinning or shaking. In still another example, a dendritic, flatter crystal structure of aragonite can be obtained by addition of alcohol and/or water (e.g., at least 5 wt %, at least 10 wt %, at least 15 wt % of the calcium carbonate slurry) and/or with spinning and/or shaking the calcium carbonate slurry during precipitation.

Additionally, crystals in calcium carbonate slurry can be purified by spray-drying to remove all non-crystalized calcium carbonate molecules as well as other reagents contained in the calcium carbonate slurry (e.g., acid, chelator, salt, water, alcohol, etc.). Any suitable technique/conditions of spray-drying of the slurry can be used. For example, the spray-drying operation may be carried by placing atomizing nozzles near the drying gas source and spraying the slurry concurrently or in the same direction as the flow of the drying gas at temperatures from about 200° F. to about 1500° F., preferably from about 250° F. to about 1200° F., and more preferably from about 300° F. to about 800° F.

In some embodiments, the calcium carbonate slurry or restructured calcium carbonate crystals may be coupled or reacted with a matrix molecule to modify its chemical and/or physical characteristics. Thus, as used herein, a matrix molecule can be any molecule that can be chemically or physically coupled with the restructured calcium carbonate crystals or calcium carbonate polymorphs to form a physically or chemically distinct material or substance. For example, the calcium carbonate slurry (or calcium carbonate polymorph) may be mixed with a plasticizing reagent (a type of matrix molecule) to form a polymer. Exemplary suitable plasticizing reagents include polylactic acid, ethylene, chitosan, polyaspartate, magnesium chloride, and so on. For example, calcium carbonate polymorphs in the calcium carbonate slurry can react with chitosan, polyaspartate or polyacrylic acid, and/or magnesium chloride to form a thin film or a distinct polygonal crystal. In another example, calcium carbonate polymorphs in the slurry can react with polylactic acid (PLA) to form a copolymer (e.g., nano particle calcium carbonate (n-NPCC) copolymer with PLA or PLA/n-NPCC composite), for example using co-rotating extruder and $2^n$ factorial planning. It is contemplated that such PLA/n-NPCC composite generated from calcium carbonate polymorphs in the calcium carbonate slurry can add rigidity to biocompatible PLA polymer such that the copolymer can be used as a biocompatible plastic (or plastic substitute) with less brittle fracture behavior.

In other embodiments, restructured calcium carbonate crystals (obtained from unstructuring and recrystallizing process) can be further modified by coupling with graphene, carbon nanotubes, nano clay, or graphdiyne to modify the tensile strength, mechanical shear stress resistance, electric or thermal conductivity, or other chemical or mechanical properties (e.g., high temperature resistance, etc.). For example, the restructured calcium carbonate crystals can form a thin sheet or layer and a plurality of graphene (or carbon nanotubes, nano clay, or graphdiyne) can be placed in between the sheets or layers of restructured calcium carbonate crystals (e.g., sandwich structure), which can be resistant to high heat (e.g., a decomposition temperature of at least 1000° C., etc.). Alternatively, restructured calcium carbonate crystals can be encapsulated or captured inside the hollow spaces created by web-like structure of graphene or carbon nanotubes.

In certain embodiment, the restructuring process of calcium carbonate described above enables the morphing of calcium carbonate into various forms that are suitable in industrial uses. In one embodiment, such restructured calcium carbonate has medical uses, including dental structure (e.g., artificial bone material for dental implant procedure, artificial dental root, artificial tooth enamel substitute, etc.), tissue scaffolds (e.g., osteoinductive bone substitute, etc.), or cell growth or tissue culture substrate (e.g., 2D or 3D model of cell culture substrate, etc.).

Further, the restructured calcium carbonate can be used to reduce carbon footprint and environmental impact in limestone mining. Also, the restructured calcium carbonate can be used to develop new synthetic materials that substitutes glass, paper, or plastic (with higher tensile strength or higher resistance to shear stress, etc.) that enable manufacturing a thin (and/or pliable) casing for any hardware product (e.g., backend casing of a slim, wallpaper TV, etc.).

Figure 2:
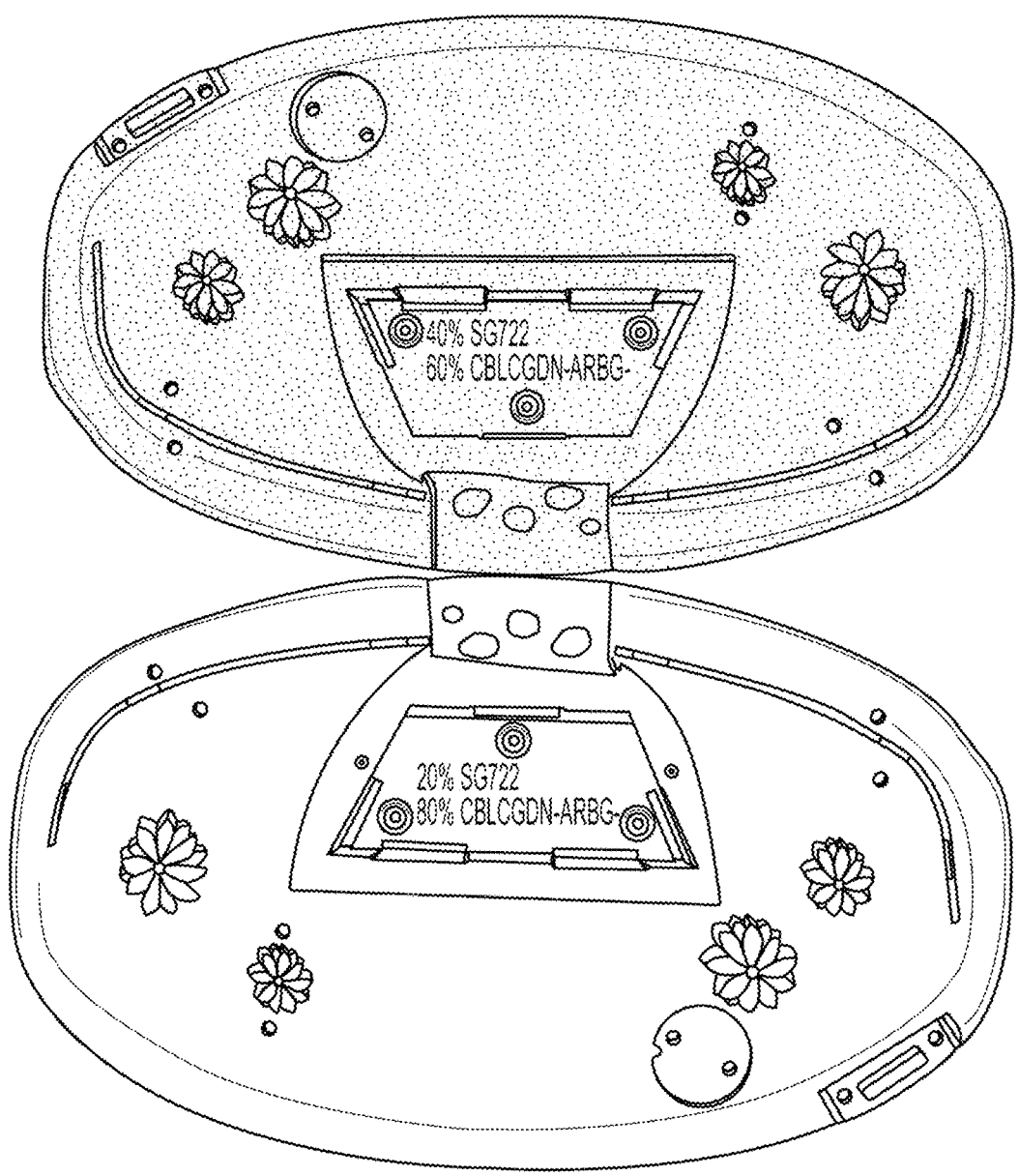
FIG. 2 shows a mold generated using a material containing restructured calcium carbonate.

Still further, the restructured calcium carbonate can be used to generate a material suitable for forming a mold as shown in FIG. 2 (e.g., injection molding, etc.) (e.g., replacing gypsum plasters, polyurethane, rubbers, epoxy, silicone, etc.). In such case, the material may contain at least 10%, at least 20%, at least 30%, at least 40%, at least 50%, at least 60%, at least 70% of aragonite combined or co-polymerized with other traditional mold materials. Alternatively, the mold material can be substantially pure aragonite, having aragonite content over 90% w/w, over 95% w/w, or over 99% w/w. Alternatively and/or additionally, the restructured calcium carbonate can be used to develop new synthetic materials (in a solid form or semi-liquid form, etc.) as a 3D printing ink material. In some embodiments, restructured calcium carbonate can comprise one or more fillers, including biodegradable fillers; starch for example. Thus, in some scenarios the mold material can comprise compressed starch compressed with the material during manufacture of a target work piece.

In addition to the asphalt pavement composition, restructured calcium carbonate as described herein can be used as construction materials including "green" concrete material, plastic substitute, or a filter material. For example, a strong engineered wood board can be generated using a combined material of wood chips, aragonite, graphene, and/or a binder. In such example, wood chips, aragonite, graphene, and/or a binder can be placed separately in each layer (e.g., wood chip layer, aragonite layer, graphene layer, binder layer, etc.) or a composite of one or more materials (e.g., wood chip layer, aragonite and graphene layer, binder layer, etc.). Alternatively, wood chip, aragonite, graphene, and binder can be all mixed in one layer as a composite material. Optionally, such generated engineered wood board material can be further processed to be capped or clad with graphene, and/or a combination of the restructured calcium carbonate with stone powder and graphene. Additionally, the engineered wood board material can be painted with a paint containing graphene-restructured calcium carbonate.

Alternatively and/or additionally, the restructured calcium carbonate can be used to generate a fabric material for clothing or for any other goods using such fabric material. For example, the restructured calcium carbonate can be added to a graphene-polymer composite (where the graphene is mixed with the polymer as a single-layer flat sheet), in a single layer within the same layer of the graphene-polymer composite or in a single layer as a separate layer on top of the graphene-polymer composite (e.g., as a coating layer, etc.) to generate a fibrous material and/or a material for clothings, etc. In some embodiments, the polymer can be polypropylene, polychloroprene (neoprene or pc-rubber), or any other types of rubber or rubber-like polymer, which can be used in light-weight, water-proof, and/or thermal-insulating garments including wet suits, purses, and/or other types of clothing, covers, etc. Alternatively and/or additionally, such restructured calcium carbonate-graphene-polymer composites can be used as fillers for providing thermal insulations (e.g., filler for jacket, filler material for construction, etc.) or a material for thermal storage (e.g., bricks, layers, sheets, drywall, balls, pellets, etc.).

The restructured calcium carbonate can be used to generate a multi-purpose absorption material when it is restructured as a highly-porous and high-surfaced material. For example, the composite material containing restructured calcium carbonate can absorb oil spills onshore or offshore or absorb greenhouse gas (e.g., methane gas) or flue gas (especially NOx). Where the restructured calcium carbonate absorbs methane gas, it is preferred that the restructured calcium carbonate be formulated (or restructured) with a sorbent selectivity of $CH_4$ over $CO_2$>1. In such example, absorbed $CH_4$ in the restructured calcium carbonate-containing material can be further processed (e.g., as a fuel cell or battery, etc.) to generate alternative fuels (e.g., alcohol) by electrochemical oxidation (e.g., electrocatalytic conversion of methane, etc.). Alternatively and/or additionally, where the restructured calcium carbonate absorbs flue gas (especially NOx and/or $SO_2$), the restructured calcium carbonate can be used as an adsorbent material of a pressure swing adsorption system as a trap for nitrogen molecules or $SO_2$ gas at high pressure. Thus, in one embodiment, the restructured calcium carbonate (and optionally graphene nanoplates (GNP)) can be combined with coal to generate more environmentally friendly coal for household or industrial use. Such coal, at high temperature while burning, can sequester $CO_2$ and/or $SO_2$ gas in the coal to prevent air pollution as well as to reuse the sequestered carbon or sulfur in the used coal.

In another example, composite materials containing restructured calcium carbonate can be used to absorb any toxic gas or molecule (e.g., nerve gas, etc.) as a detoxifying agent or as a protecting gear. In still another embodiment, composite materials containing restructured calcium carbonate can be used to absorb hydrogen molecules as an energy storage compartment. One should appreciate, as discussed previously, graphene (e.g., graphene nanoplatelets, etc.) may also be combined the calcium carbonate to adjust, enhance, or otherwise alter composition's properties toward its intended use.

Alternatively, composite materials containing restructured calcium carbonate can be formed into beads to carry pharmaceutical compositions, drugs, or any other chemicals (e.g., fertilizer, etc.) or biological materials (e.g., bacteria, yeast, for microbiome delivery to the gastrointestinal tract, etc.), for which delayed release is desirable. In such example, the restructured calcium carbonate is preferably formulated (or restructured) such that the restructured calcium carbonate includes porous structures to hold pharmaceutical composition, drugs, chemicals, or biological materials. Such beads can hold at least one molecules (or organism (e.g., bacteria, yeast, etc.)), at least two molecules, at least 5 molecules per porous structure.

In certain embodiments, restructured calcium carbonate as described herein can be ground to particles of 0.1-10 µm in diameter (e.g., 1 µm diameter, 3 µm diameter, 5 µm diameter, etc.) and coated with positively charged coatings (e.g., a cationic lipid). Suitable cationic lipids include, benzalkonium chloride (BAK), benzethonium chloride, cetrimide (which contains tetradecyltrimethylammonium bromide and possibly small amounts of dodecyltrimethylammonium bromide and hexadecyltrimethyl ammonium bromide), cetylpyridinium chloride (CPC), cetyl trimethylammonium chloride (CTAC), primary amines, secondary amines, tertiary amines, including but not limited to N,N', N'-polyoxyethylene (10)-N-tallow-1,3-diaminopropane, other quaternary amine salts, including but not limited to dodecyltrimethylammonium bromide, hexadecyltrimethylammonium bromide, mixed alkyl-trimethyl-ammonium bromide, benzyldimethyldodecylammonium chloride, benzyldimethylhexadecyl-ammonium chloride, benzyltrimethylammonium methoxide, cetyldimethylethylammonium bromide, dimethyldioctadecyl ammonium bromide (DDAB), methylbenzethonium chloride, decamethonium chloride, methyl mixed trialkyl ammonium chloride, methyl trioctylammonium chloride, N,N-dimethyl-N-[2(2-methyl-4-(1,1,3,3tetramethylbutyl)-phenoxy]-ethoxy) ethyl]-benzenemetha-naminium chloride (DEBDA), dialkyldimethylammonium salts, [1-(2,3-dioleyloxy)-propyl]-N,N,N,trimethylammonium chloride, 1,2-diacyl-3-(trimethylammonio) propane (acyl group=dimyristoyl, dipalmitoyl, distearoyl, dioleoyl), 1,2-diacyl-3(dimethylammonio)propane (acyl group=dimyristoyl, dipalmitoyl, distearoyl, dioleoyl), 1,2-dioleoyl-3-(4'-trimethyl-ammonio) butanoyl-sn-glycerol, 1,2-dioleoyl 3-succinyl-sn-glycerol choline ester, cholesteryl (4'-trimethylammonio) butanoate), N-alkyl pyridinium salts (e.g. cetylpyridinium bromide and cetylpyridinium chloride), N-alkylpiperidinium salts, dicationic bolaform electrolytes (C12Me6; C12Bu6), dialkylglycetylphosphorylcholine, lysolecithin, L-α dioleoylphosphatidyl-ethanolamine, cholesterol hemisuccinate choline ester, lipopolyamines, including but not limited to dioctadecylamidoglycylspermine (DOGS), dipalmitoyl phosphatidylethanol-amidospermine (DPPES), lipopoly-L (or D)-lysine (LPLL, LPDL), poly (L (or D)-lysine conjugated to N-glutarylphosphatidylethanolamine, didodecyl glutamate ester with pendant amino group (C12GluPhCnN+), ditetradecyl glutamate ester with pendant amino group (C14GluCnN+), cationic derivatives of cholesterol, including but not limited to cholesteryl-3β-oxysuccinamidoethylenetrimethylammonium salt, cholesteryl-3β-oxysuccinamidoethylenedimethylamine, cholesteryl-3β-carboxyamidoethylenetrimethylammonium salt, cholesteryl-3β-carboxyamidoethylenedimethylamine, and 3γ-[N—(N',N-dimethylaminoetanecarbomoyl]cholesterol) (DC-Cholesterol), 1,2-dioleoyloxy-3-(trimethylammonio) propane (DOTAP), dimethyl dioctadecyl-ammonium (DDA), 1,2-Dimyristoyl-3-TrimethylAmmoniumPropane (DMTAP), dipalmitoyl-trimethyl ammonium propane (DPTAP), distearoyltrimethylammonium propane (DSTAP), and combination thereof. These lipid-coated, micronized calcium carbonate compositions can serve as carriers for mRNA, e.g., in mRNA-based vaccine compositions.

For example, where the modified aragonite particles are used in a vaccine formulation, it is especially contemplated that such vaccine formulations are nucleic acid-based vaccine formulations that deliver a recombinant nucleic acid to a desired target cell or target tissue. For example, and among other target cells and tissues, contemplated target cells and tissues include immune competent, and especially antigen presenting cells such as dendritic cells, monocytes, phagocytes, macrophages, etc. Likewise, and depending on the route of administration, target tissues may be tumor tissues, muscle tissue, and liver tissue. Of course, it will be readily recognized that the nucleic acid can be a recombinant DNA and/or a recombinant RNA (e.g., mRNA, miRA, shRNA, antisense RNA, self-amplifying RNA, modRNA, etc.) that encode one or more recombinant proteins. Most typically, where the modified aragonite particles are used in a vaccine, the recombinant nucleic acid will encode one or more proteins or protein portions of a pathogenic organism (e.g., pathogenic virus (e.g., coronavirus, influenza virus, HIV virus, etc), pathogenic bacterium, etc.). On the other hand, where the vaccine is used in a cancer immune therapy, it is contemplated that the recombinant nucleic acid will encode one or more proteins or protein portions (e.g., neoepitopes) of a cancer associated protein, a cancer specific antigen, and/or a tumor and patient specific neoantigen. Of course, such proteins or protein portions can be further modified to effect intracellular trafficking to a desired location (e.g., using an enhanced T-cell stimulation domain (ETSD) to the endosomal and/or lysosomal subcellular compartments; see e.g., doi.org/10.1101/2020.07.29.227595, incorporated by reference herein).

Regardless of the type and sequence encoded in the recombinant nucleic acid, it is especially contemplated that the nucleic acid is bound to the modified aragonite particles using a cationic compound that is coated onto the modified aragonite particles. Most typically, such cationic compounds will include a quaternary ammonium compound or a cationic lipid (and particularly DOTAP) as is described above to so provide for ionic binding of the nucleic acid (which is in anionic form at physiological pH (about pH 7.4)). Additionally, it should be appreciated that the modified aragonite particles may be further coated with additional surfactants, and especially preferred surfactants include one or more hydrophobic surfactants and/or hydrophilic surfactants to facilitate delivery of the nucleic acid to the target cell or tissue. Additional details about nucleic acid carriers for use in vaccine formulations are disclosed in U.S. published patent application 2020/0230056 to Fox et al. titled "Nanostructured Lipid Carriers and Stable Emulsions and Uses Thereof", filed as a PCT on Jun. 15, 2018, and which is incorporated herein by reference in its entirety.

With respect to formulations of the modified aragonite particles it is generally preferred that the particles will be in a sterile pharmaceutically acceptable solution for injection or infusion, and that the modified aragonite particles will have a particle size that have an average diameter less than or equal to 10 µm, such as an average particle diameter of between 100 nm and 10 µm or an average particle diameter of between 10 nm and 1 µm.

In certain embodiments, composite materials containing restructured calcium carbonate having an absorption and delayed release characteristics can be further used to generate various household items including pet-related items (e.g., cat litter, etc.), an odor remover (e.g., deodorant, etc.), sanitary products, or any other cleaning materials. In such example, the composite material preferably includes bactericidal graphene.

In some embodiments, restructured calcium carbonate as described herein can be used as a food source. For example, restructured calcium carbonate can be infused with non-animal protein (e.g., obtained from soybean, etc.) and heme (e.g., heme obtained from animal blood or heme obtained from soy plant, etc.) to form a calcium-enriched meat substitute (e.g., vegan meat or tofu, etc.).

In some embodiments, restructured calcium carbonate can be used as exfoliating, polishing, or grinding materials (e.g., a toothpaste, a whitening reagent, a cleaning material, dish soap, pet chew toys, etc.). Preferably, the restructured calcium carbonate may be combined or mixed with graphene (in 10:1 ratio, 20:1 ratio, 30:1 ratio) to increase the firmness or stiffness of the composite containing the restructured calcium carbonate.

In certain embodiments, the restructured calcium carbonate for use in toothpaste will be derived from oolitic aragonite, which naturally contains fluorine. In certain embodiments, the toothpastes made with restructured calcium carbonate will also contain additional fluorine beyond that which is naturally derived from the oolitic aragonite source. For example, contemplated toothpastes may have added fluoride where the added fluoride is present in an amount of at least 500 ppm, or at least 750 ppm, or at least 1,000 ppm, or at least 1,500 ppm, or at least 2,000 ppm, or at least 2,500 ppm, or at least 3,000 ppm, or at least 3,500 ppm, or at least 4,000 ppm, or at least 4,500 ppm, or at least 5,000 ppm, and even higher. Therefore, contemplated toothpaste formulations may include between 500 and 1,500 ppm added fluoride, or between 1,500 and 3,000 ppm added fluoride, or between 3,000 and 5,000 ppm added fluoride, and even more.

As will be readily appreciated, the fluoride may be added in various inorganic and organic forms. However, it is generally preferred that the added fluoride will be in the form of a fluoride salt such as NaF, SnF, or monofluor phosphate (MFP). Moreover, it should be appreciated that the fluoride can be added to or coated onto the restructured oolitic aragonite in a desirable quantity. However, in yet other embodiments, the fluoride salt can also be incorporated into the calcium carbonate mixture after acid/chelator treatment of the oolitic aragonite. Consequently, upon restructuring (recrystallization), the added fluoride will be distributed throughout the restructured oolitic aragonite particles. Of course, it should also be noted that were the oolitic aragonite particles are not restructured, the oolitic aragonite particles may be coated or otherwise impregnated with the fluoride salts.

Regardless of the particular shape, it is contemplated that the so fluoride enhanced modified aragonite particles will have a size suitable for formulating into a toothpaste and to act as an abrasive for dental plaque. Advantageously, thusly prepared modified aragonite particles will have a hardness sufficient to remove dental plaque and biofilm from dentin without damaging the dentin on a tooth. Most typically, hardness will be at least 2, or at least 3, or at least 3.5, or at least 3.7, or at least 4 on the Mohs scale, and less than 6 on the Mohs scale. Suitable sizes of the modified aragonite particles will be typically less than 50 µm, and more preferably less than 50 µm, and most preferably less than 10 µm. For example, the modified aragonite particles have an average particle diameter of between 100 nm and 10 µm, and in dental cleaning/polishing applications, the modified aragonite particles have an average particle diameter of between 10 nm and 1 µm Moreover, it is noted that the toothpaste formulations will further include various additional agents such as additional abrasives, detergents, viscosity/gelling agents, flavorants, antibacterial agents, and/or whitening agents. For example, suitable additional agents include calcium phosphate, aluminum hydroxide, or silica as additional abrasives, various agents to adjust viscosity such as substituted celluloses and other hydrophilic polymeric compounds (e.g., carboxymethylcellulose, alginate, carrageenan, gums, carbomers, etc.). Likewise, contemplated toothpaste formulations may also include humectants, foaming agents, etc., and preferred detergents include sodium alkyl sulfates (e.g., SDS). Sodium benzoate, triclosan, methylparaben, and/or ethylparaben may be added as antimicrobial agents, ad hydrogen peroxide or any precursor thereof may be added as a whitening agent. Finally, flavorants and sweeteners can be used as is well known in the art.

Therefore, the inventors also contemplate a method of preparing a calcium carbonate-based composition that includes a step of providing oolitic aragonite particles and treating the aragonite with an acid and a chelator to unstructure the aragonite particles. In another step, the unstructured aragonite particles are recrystallized to form restructured oolitic aragonite particles, and a negatively charged bioactive agent that is negatively charged at physiological pH is coupled to or included in the restructured oolitic aragonite particles. In this context, it should be appreciated that the restructuring can be done in the presence of a cationic compound as described above, or that the restructured oolitic aragonite particles can be coated with the cationic compound.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. Where the specification or claims refer to "at least one" of something selected from the group consisting of A, B, C . . . and N, the text should be interpreted as requiring only one element from the group, not A plus N, or B plus N, etc.

What is claimed is:

1. A calcium carbonate-based composition, comprising:
    a plurality of restructured oolitic aragonite particles coated with a positively charged coating, and a carrier;
    wherein the restructured oolitic aragonite particles comprises oolitic aragonite particles that are treated with an acid and a chelator to unstructure the aragonite particles, and the unstructured aragonite particles are recrystallized to form restructured politic aragonite particles;
    wherein the restructured oolitic aragonite particles have an average diameter of less than or equal to 10 µm;
    wherein a negatively charged bioactive agent is bound to the positively charged coating;
    wherein the restructured oolitic aragonite particles are modified to deliver the negatively charged bioactive agent to a target cell or target tissue in a mammal when the composition is administered to the mammal; and
    wherein the bioactive agent is negatively charged at physiological pH.

2. The composition of claim 1, wherein the particles are in a sterile pharmaceutically acceptable solution for injection and/or infusion.

3. The composition of claim 1, wherein the modified aragonite particles have an average particle diameter of between 100 nm and 10 µm.

4. The composition of claim 1, wherein the modified aragonite particles have an average particle diameter of between 10 nm and 1 µm.

5. The composition of claim 1, wherein the carrier comprises a detergent, and optionally at least one of a viscosity agent, a flavorant, an antibacterial agent, and a whitening agent.

6. The composition of claim 5, wherein the carrier is formulated as a toothpaste.

7. The composition of claim 5, wherein the negatively charged bioactive agent is a fluoride anion.

8. The composition of claim 7, wherein the fluoride anion is present in a salt form, and wherein the salt form is coated onto or interspersed with the modified aragonite particles.

9. The composition of claim 7, wherein the positively charged coating is a cationic compound that is bound to the modified aragonite particles, and wherein the fluoride anion is bound to the positively charged coating.

10. The composition of claim 9, wherein the cationic compound is a cationic lipid a lipopolyamine, 1,2-dioleoyloxy-3-(trimethylammonio) propane (DOTAP), dimethyldioctadecyl-ammonium (DDA), 1,2-dimyristoyl-3-trimethylammonium propane (DMTAP), and/or dipalmitoyl-trimethylammonium propane (DPTAP).

11. The composition of claim 9, wherein the cationic compound is distearoyl-trimethylammonium propane (DSTAP).

12. The composition of claim 1, wherein the carrier is formulated for injection.

13. The composition of claim 12, wherein the negatively charged bioactive agent is a nucleic acid.

14. The composition of claim 13, wherein the nucleic acid is an RNA that encodes an antigen of a pathogen or that encodes an antigen of a neoplastic cell or cancer cell.

15. The composition of claim 13, wherein the nucleic acid is bound to a cationic compound that is bound to the modified aragonite particles.

16. A method of preparing a calcium carbonate-based composition, comprising:
    providing oolitic aragonite particles, and treating the aragonite with an acid and a chelator to unstructure the aragonite particles;
    recrystallizing the unstructured aragonite particles to form restructured oolitic aragonite particles; and
    coupling to or including in the restructured oolitic aragonite particles a negatively charged bioactive agent that is negatively charged at physiological pH.

17. The method of claim 16, wherein the restructured oolitic aragonite particles have an average particle diameter of between 100 nm and 10 µm.

18. The method of claim 16, wherein the bioactive agent is coupled to the restructured oolitic aragonite particles via a cationic compound that is bound to the restructured politic aragonite particles.

19. The method of claim 16, wherein the negatively charged bioactive agent is a fluoride anion and wherein the composition is formulated as a toothpaste.

20. The method of claim 16, wherein the negatively charged bioactive agent is a nucleic acid and wherein the composition is formulated as a vaccine composition.

* * * * *